United States Patent [19]
Kamiguchi et al.

[11] Patent Number: 5,030,395
[45] Date of Patent: Jul. 9, 1991

[54] METHOD AND AN APPARATUS FOR PRESSURE CONTROL OF A MOTOR-OPERATED INJECTION-MOLDING MACHINE

[75] Inventors: Masao Kamiguchi; Minoru Kobayashi; Noriaki Neko, all of Yamanashi, Japan

[73] Assignee: Fanuc Ltd., Minamitsuru, Japan

[21] Appl. No.: 425,184
[22] PCT Filed: Mar. 7, 1989
[86] PCT No.: PCT/JP89/00244
§ 371 Date: Oct. 16, 1989
§ 102(e) Date: Oct. 16, 1989
[87] PCT Pub. No.: WO89/08543
PCT Pub. Date: Sep. 21, 1989

[30] Foreign Application Priority Data
Mar. 8, 1988 [JP] Japan .................................. 63-52500
Apr. 26, 1988 [JP] Japan .................................. 63-101285

[51] Int. Cl.⁵ .............................................. B29C 45/77
[52] U.S. Cl. ................................. 264/40.5; 264/328.13; 425/145; 425/149; 425/156; 425/159
[58] Field of Search ..................... 264/40.1, 40.5, 40.7, 264/328.13; 425/135, 145, 149, 155, 156, 159

[56] References Cited
U.S. PATENT DOCUMENTS
4,851,170 7/1989 Shimizu et al. ..................... 264/40.5

FOREIGN PATENT DOCUMENTS
61-229523 10/1986 Japan .................................. 264/40.1

Primary Examiner—Jill L. Heitbrink
Attorney, Agent, or Firm—Staas & Halsey

[57] ABSTRACT

A method and an apparatus for pressure control of a motor-operated injection-molding machine, which are capable of effecting various modes of multi-stage pressure control smoothly without mounting a special servomotor on the injection-molding machine or replacing servomotor with another servomotor. When a shift is made from an injection process into a first pressure hole stage of a pressure hold process, or from each pressure hold stage to a pressure hold stage subsequent thereto, a central processing unit for numerical control calculates a modification amount. This modification amount is obtained by dividing a value, obtained by subtracting a maximum injection pressure or a torque limit value for a preceding pressure hold stage from a torque limit value for a subsequent pressure hold stage, by a required modification frequency. The modification frequency is obtained by dividing a predetermined switching time for the subsequent pressure hold stage by a hold pressure control operation execution period (S7). The torque limit value is then gradually updated from the maximum injection pressure or the torque limit value for the preceding pressure hold stage to the torque limit value for the subsequent pressure hold stage, by adding the modification amount for each period (S8). A hold pressure actually applied to a screw by an injection servomotor, controlled by a central processing unit for servo control, satisfactorily follows up the gradually updated torque limit value, thereby ensuring smooth multi-stage pressure control.

16 Claims, 6 Drawing Sheets

TABLE TB

|  | TARGET PRESSURE | HOLD TIME | SWITCHING TIME |
|---|---|---|---|
| 1ST HOLD STAGE | $P_1$ | $T_1$ | $\Delta T_1$ |
| 2ND HOLD STAGE | $P_2$ | $T_2$ | $\Delta T_2$ |
| 3RD HOLD STAGE | $P_3$ | $T_3$ | $\Delta T_3$ |
| ⋮ | ⋮ | ⋮ | ⋮ |
| ⋮ | ⋮ | ⋮ | ⋮ |
| I-TH HOLD STAGE | $P_I$ | $T_I$ | $\Delta T_I$ |

METHOD AND AN APPARATUS FOR PRESSURE CONTROL OF A MOTOR-OPERATED INJECTION-MOLDING MACHINE

TECHNICAL FIELD

The present invention relates to a method and an apparatus for pressure control, capable of smoothly effecting multi-stage pressure control in a motor-operated injection-molding machine.

BACKGROUND ART

In an injection-molding machine, multi-stage pressure control is performed to produce good-quality moldings. For example, a pressure hold process is divided into a plurality of pressure hold stages, and target hold pressures for the individual pressure hold stages are set to values different from one another, so that the hold pressures are subjected to multi-stage control. To effect the multi-stage hold pressure control, in a motor-operated injection-molding machine, a torque limit value (target hold pressure) for restricting the output torque of a servomotor for axially driving an injection screw is successively changed with the lapse of time from an instant at which pressure hold is started, so that the hold pressure is subjected to open-loop control. Alternatively, the hold pressure is subjected to closed-loop control (feedback control) in accordance with the difference between the torque limit value thus changed in succession and a detected value of the hold pressure actually acting on resin.

However, the multi-stage pressure control of the injection-molding machine has a problem such that the actual pressure overshoots or undershoots the target pressure at the time of switching the target pressure, due to various factors, including inertia of the screw, inertia of the servomotor, incompatibility of the response output characteristic of the servomotor, and incompatibility of the control gain of a closed-loop control system. The incompatibility of the control gain can be eliminated by adjusting, for example, the proportional, differential, and integral parameters of a PID control section of the control system, without changing the arrangement of the control system. In any control method, however, it is difficult to eliminate unsatisfactory responsiveness attributable to the servomotor or the like. More specifically, in the case of mounting the injection-molding machine with a motor having a response output characteristic compatible with the type and pressure control pattern of the injection-molding machine, or in replacing a once mounted motor with another motor, so as to improve the performance for the actual pressure to follow up the target pressure, it is necessary to provide motors of various specifications and to perform replacement work for the motors. Accordingly, the production and running costs of the injection-molding machine increase considerably. In the case of setting the pressure control pattern agreeable to the motor characteristic, moreover, feasible pressure control patterns are limited, so that there are restrictions on the pressure control. Thus, none of the aforementioned countermeasures are practical for the manufacture of high-quality, low-priced moldings.

SUMMARY OF THE INVENTION

The object of the present invention is to provide a method and an apparatus for pressure control of a motor-operated injection-molding machine, in which a multi-stage pressure control pattern of the injection-molding machine, especially a target pressure switching pattern between adjacent pressure control stages, can be made compatible with the response output characteristic of a servomotor mounted on the injection-molding machine, deterioration of the responsiveness due to the inertia of the servomotor and of an operating part of a pressurization apparatus can be restrained, and various modes of multi-stage pressure control can be smoothly effected without mounting a special servomotor on the injection-molding machine or replacing a once mounted servomotor with another servomotor.

In order to achieve the above object, according to one aspect of the present invention, there is provided a pressure control method applied to a motor-operated injection-molding machine in which an operating part of a pressurization apparatus is driven by a servomotor, the pressure control method comprising steps of: (a) setting and storing a target pressure for each of a plurality of pressure control stages constituting a pressure control process and a respective predetermined switching time in which switching of the target pressures between associated adjacent pressure control stages is to be finished; (b) gradually changing the target pressure from a target pressure for a pressure control stage before transition between the adjacent pressure control stages to a target pressure for a pressure control stage after the transition, during the time from an instant at which the transition is started to an instant at which the predetermined switching time associated with the transition is elapsed, every time the transition is effected; and (c) controlling the actual pressure to each corresponding target pressure stored in the step (a), in each of the pressure control stages, and for controlling the actual pressure to the gradually changing target pressure obtained in the step (b), during each the transition.

According to another aspect of the present invention, moreover, there is provided a pressure control apparatus on an injection-molding machine for restricting the output torque of a servomotor, used to drive an operating part of a pressurization apparatus, to a torque limit value indicative of a target pressure, the pressure control apparatus comprising: means for setting a torque limit value for each of a plurality of pressure control stages constituting a pressure control process and a respective predetermined switching time in which switching of the target pressures between associated adjacent pressure control stages is to be finished; means for storing the respective torque limit value and the respective predetermined switching time thus set; means for calculating a number of repetitions of modification by dividing the predetermined switching time associated with transition between adjacent pressure control stages by a predetermined pressure control execution period, every time the transition is effected, and for calculating a modification amount by dividing the difference between a torque limit value for a pressure control stage before the transition and a torque limit value for a pressure control stage after the transition by the number of repetitions of modification; means for gradually updating the torque limit value for the transition between the adjacent pressure control stages from the torque limit value for the pressure control stage before the transition to the torque limit value for the pressure control stage after the transition, by adding the modification amount for each predetermined pressure control execution period, during the time from an instant at which the transition is started to an instant at which the predetermined switching time associated with the transition is elapsed, every time the transition is effected; and means for controlling the actual pressure to each corresponding stored target pressure in each of the pressure control stages, and for controlling the actual pressure to each corresponding torque limit value for the transition during each transition.

According to still another aspect of the present invention, there is provided a pressure control apparatus of an injection-molding machine for restricting the output torque of a servomotor, used to drive an operating part of a pressurization apparatus, to a torque limit value indicative of a target pressure, the pressure control apparatus comprising: means for setting a torque limit value for each of a plurality of pressure control stages constituting a pressure control process and a respective predetermined switching time in which switching of the target pressures between associated adjacent pressure control stages is to be finished; means for storing the respective torque limit value and the respective predetermined switching time thus set; means for periodically calculating a respective torque limit value for transition between associated adjacent pressure control stages, every time the transition is effected, in such a manner that the target pressure gradually changes from a target pressure for a pressure control stage before the transition to a target pressure for a pressure control stage after the transition, and that an amount of change of the target pressure at the end of the transition approaches zero, in accordance with a predetermined arithmetic expression including, as parameters, the predetermined switching time associated with the transition, the respective torque limit values for the pressure control stages before and after the transition, and the lapse of time from an instant at which the transition starts; and means for controlling the actual pressure to each corresponding stored target pressure in each of the pressure control stages, and controlling the actual pressure to each corresponding torque limit value for the transition during each transition.

As mentioned above, according to the present invention, the target pressure (torque limit value) is gradually changed from the target pressure for the pressure control stage before the transition to the target pressure for the pressure control stage after the transition within the predetermined switching time, during the transition between the pressure control stages of the pressure control process. Accordingly, the resulting pressure control pattern, especially the target pressure switching pattern between adjacent pressure control stages, can be made compatible with the response output characteristic of the servomotor mounted on the injection-molding machine, deterioration of the responsiveness due to the inertia of the servomotor and of the operating part of the pressurization apparatus can be restrained, deterioration of the performance for the actual pressure to follow up the target pressure, attributable to the switching of the target pressure during multi-stage pressure control, can be prevented, and the multi-stage pressure control can be smoothly effected, without mounting a special servomotor on the injection-molding machine, so that high-quality, low-priced moldings can be manufactured.

DESCRIPTION OF THE PREFERRED EMBODIMENTS

Figure 1:
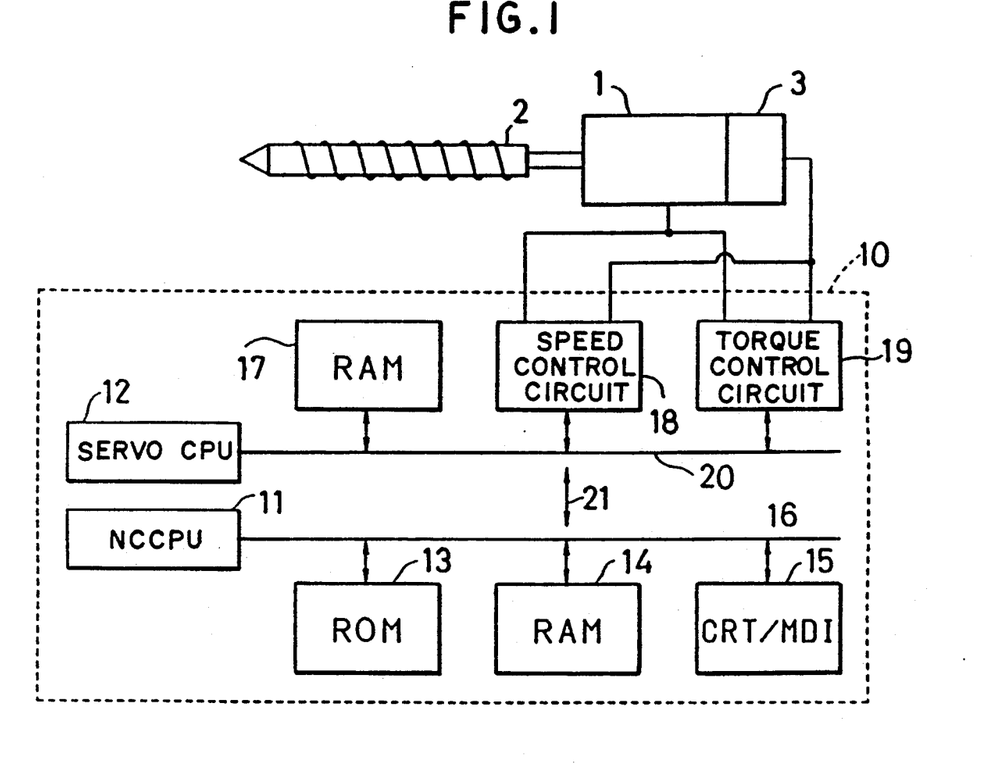
FIG. 1 is a schematic block diagram showing the principal part of a motor-operated injection-molding machine provided with a pressure control apparatus according to one embodiment of the present invention.
Figure 2:
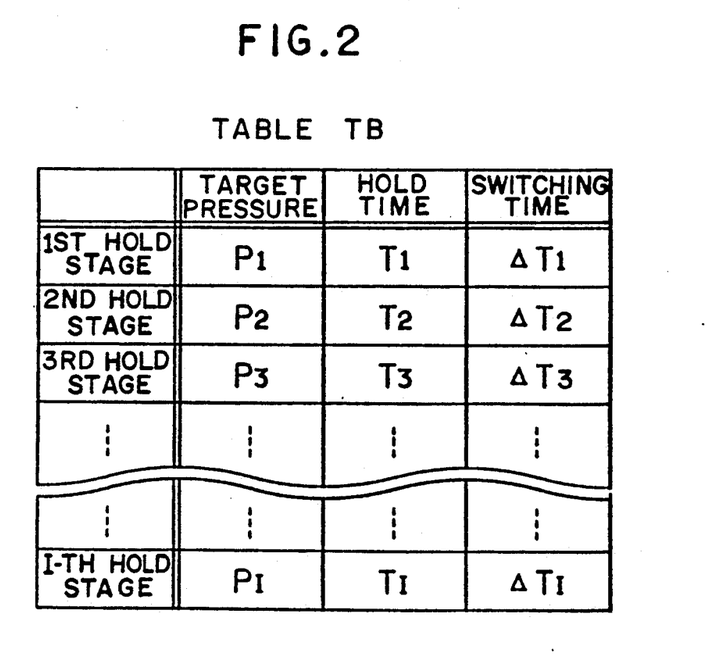
FIG. 2 shows a table for storing the torque limit value, pressure hold time, and predetermined switching time for each of several pressure hold stages.

A motor-operated injection-molding machine to which is applied a multi-stage pressure control method according to one embodiment of the present invention comprises, as pressurization apparatuses, an injection/pressure hold apparatus, a mold clamping apparatus, an ejector (none of which are shown), etc. As shown in FIG. 1, the injection/pressure hold apparatus includes an injection servomotor 1 for axially driving a screw 2 as an operating section and a servomotor (not shown) for screw rotation, and a position detector, e.g., a pulse coder 3, is attached to the servomotor 1.

Further, the injection-molding machine comprises a control device 10 which has a function as a pressure control device and other conventional control functions. The control device 10 comprises a numerical control central processing unit (hereinafter referred to as NCCPU) 11 for controlling the operation of the whole injection-molding machine, pulse distribution processing for servomotors for various axes, etc., and a servo control central processing unit (hereinafter referred to as servo CPU) 12 for controlling the respective speeds and output torques of the servomotors for the individual axes, in accordance with command values from the NCCPU 11 (e.g., the amount of pulse distribution for each axis and a torque limit value for an injection axis).

The NCCPU 11 is connected with a ROM 13, a RAM 14, and a manual data input device (hereinafter referred to as CRT/MDI) 15 with a CRT display by means of busses 16. The ROM 13 serves to store a control program for managing the whole injection-molding machine, a sequence program for controlling the sequence operation of the injection-molding machine, a program for controlling the servo CPU 12, etc., while the RAM 14 is adapted to store various parameters, including the maximum injection pressure (target injection pressure at the final stage of an injection process), set individually by means of the CRT/MDI 15, and torque limit values (target hold pressures), pressure hold times, and predetermined switching times for several pressure hold stages of a pressure hold process.

The servo CPU 12 is connected, through busses 20, with a RAM 17, a speed control circuit 18, and a torque control circuit 19 which, in conjunction with the elements 17 and 18, constitutes a so-called software servo. The servo CPU is so arranged that various data, command values from the NCCPU 11, and a program for servo CPU control transferred from the CPU 11 through busses 21 when electric power is turned on are temporarily stored in the RAM 17, and that the speed of the servomotor 1 is controlled in accordance with the amount of pulse distribution from the CPU 11 and a feedback signal from the pulse coder 3, and that the output torque of the servomotor 1 is controlled in accordance with the torque limit value.

Referring now to FIGS. 1 to 7, hold pressure control operation of the injection-molding machine according to the present embodiment will be described.

Figure 5:
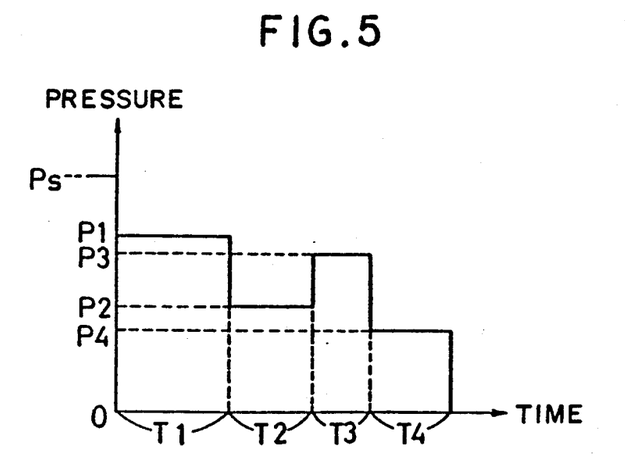
FIG. 5 is a diagram showing the relationship between torque limit value and pressure hold time stored in the table.

First, an operator enters the number I of pressure hold stages of the pressure hold process, the torque limit values $P_i$ (i=1, 2, ..., I), pressure hold times $T_i$, and predetermined switching times $\Delta T_i$ for the individual pressure hold stages, and the various other parameters, including the maximum injection pressure, into the control device 10, by means of the CRT/MDI 15. In response to this data entry operation, the NCCPU 11 causes the parameters I, $P_i$, $T_i$, and $\Delta T_i$ to be stored in Table TB (FIG. 2) in the RAM 14. In the present embodiment, the pressure hold process comprises the first to fourth pressure hold stages (I=4), as shown in FIG. 5. When injection-molding operation of the injection-molding machine is started after the data entry operation is completed, the injection-molding machine repeatedly executes an injection-molding cycle which consists of a series of processes, including mold clamping, injection, pressure hold, metering, mold opening, and product ejection.

When the pressure hold process is entered in a first injection-molding cycle (generally, each injection-molding cycle), the NCCPU 11 executes the hold pressure control operation. This operation mainly includes torque limit value setting process, at intervals of cycle which is the same as a pulse distribution execution period for the servomotors for various axes, for example, in accordance with the control program shown in FIGS. 3 and 4. Namely, at the start of the pressure hold process, the CPU 11 determines whether a value C (indicative of a number of repetitions of update of a torque limit value (mentioned later)) in a modification frequency counter, provided, for example, in the RAM 14, is "0" (Step S1). The modification frequency counter is reset to "0" by initialization at the time of power-on operation, so that the counter value at the start of the pressure hold process of the first injection-molding cycle is "0," and the decision in Step S1 is positive. Then, the NCCPU 11 discriminates the present or subsequent pressure hold stage number (i+1), in accordance with a value i in a pressure hold stage number counter provided, for example, in the RAM 14. This counter is reset at the time of the power-on operation, whereupon the counter value is "0." Accordingly, the CPU 11 regards the pressure hold stage as a first one, and reads out a predetermined switching time $\Delta T1$ (generally, $\Delta T_{i+1}$) for the first pressure hold stage from Table TB (Step S2). Then, the CPU 11 calculates a required modification frequency (a number of repetitions of modification) n by dividing the switching time $\Delta T1$ by a hold pressure control operation execution period $\tau$ (Step S3), and determines whether the value i in the pressure hold stage number counter is "0" (Step S4). Hereupon, the pressure hold stage is the first pressure hold stage (i=0), the decision is positive, so that the program proceeds to Step S5.

Figure 3:
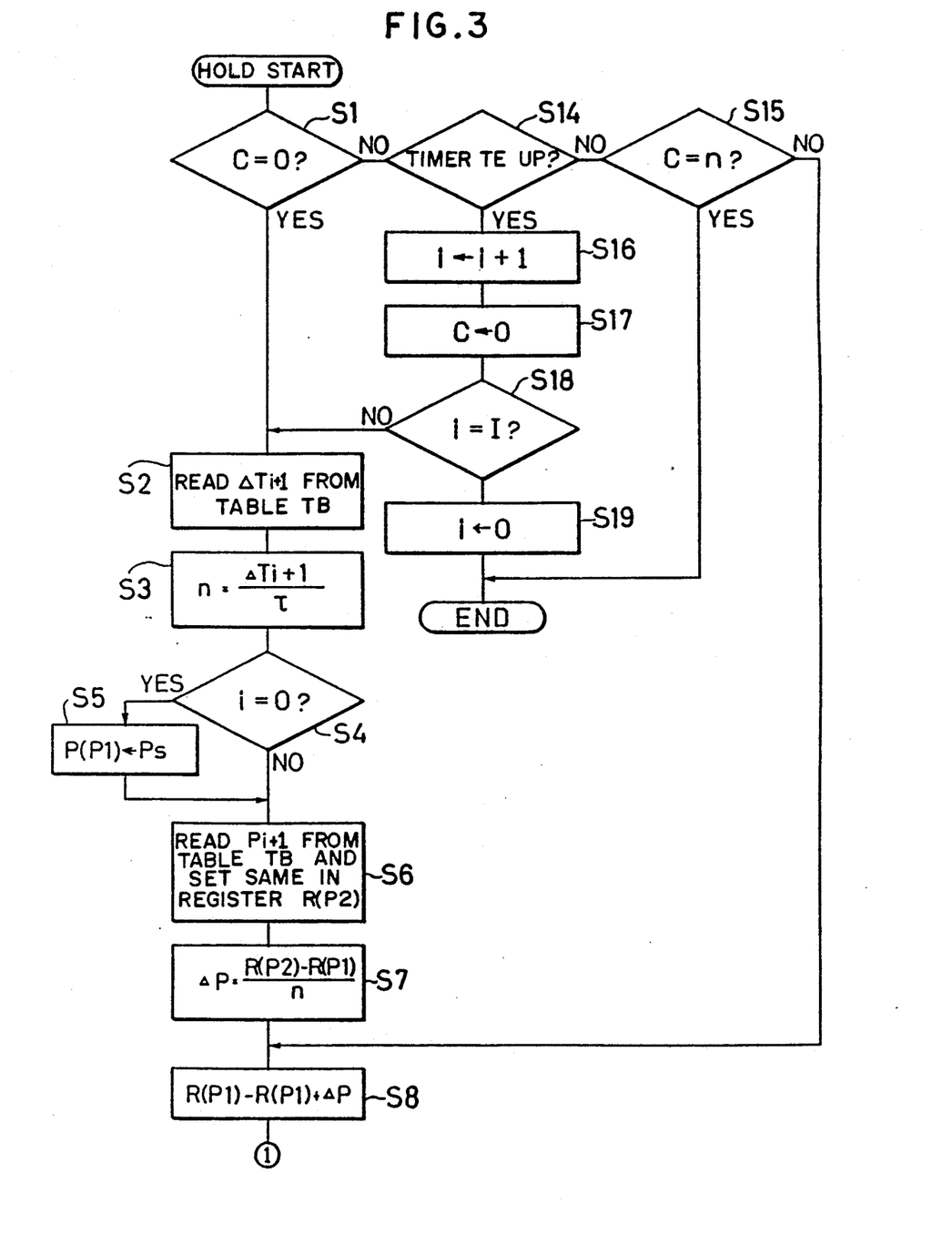
FIG. 3 is a flow chart showing part of hold pressure control operation according to one embodiment of the present invention, executed in the injection-molding machine of FIG. 1.
Figure 4:
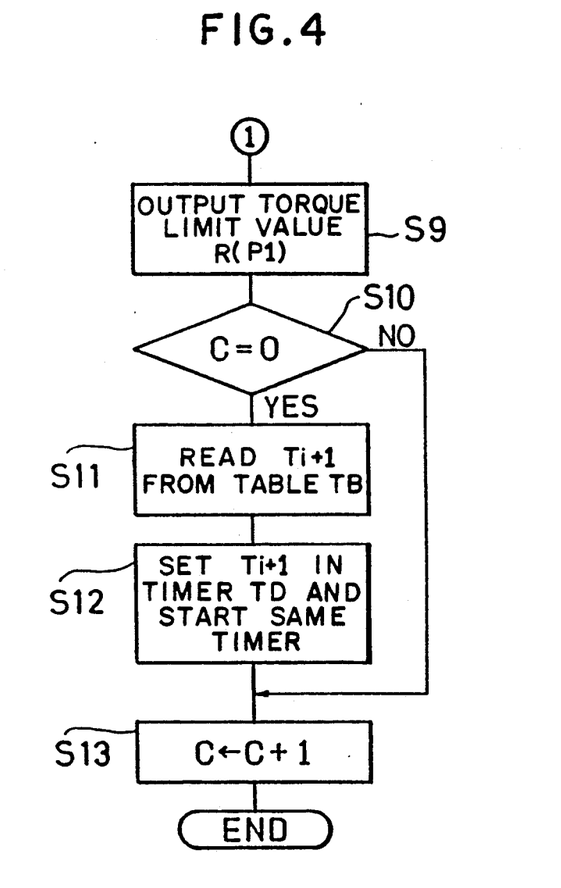
FIG. 4 is a flow chart showing the remainder of the hold pressure control operation.

In Step S5, a target pressure for the final stage (pressure control stage) of the injection process, e.g., a maximum injection pressure PS (generally, a target pressure for the preceding pressure control stage from which the transition is effected), is set in a first register R (P1) provided, for example, in the RAM 14. Subsequently, a torque limit value P1 (generally, a value $P_{i+1}$ for the subsequent pressure hold stage to which the transition is effected) for the first pressure hold stage is read out from Table TB, and is set in a second register R (P2) provided, for example, in the RAM 14 (Step S6). Then, the value in the first register R (P1) is subtracted from the value in the second register R (P2), thereby calculating the difference between the two values, and the calculated value is divided by the modification frequency n obtained in Step S3, thereby calculating (Step S7) a modification amount $\Delta P$ of the torque limit value for each pressure hold process execution period $\tau$ (here $\Delta P$ (<0)=(P1−Ps)/n). Further, the modification amount $\Delta P$ is added to the value in the first register R (P1), and the sum is stored in this register (Step S8), and the same sum is stored in a torque limit value storage region of the RAM 17, thereby updating or modifying the torque limit value (Step S9).

Then, whether the value C in the modification frequency counter is "0" is determined (Step S10). Here the decision is positive, and the program proceeds to Step S11, whereupon a pressure hold time T1 (generally, $T_{i+1}$) for the first pressure hold stage is read out from Table TB, and is set in a timer TE, thereby starting the timer (Step S12). Then, "1" is added to the value in the modification frequency counter (Step S13), whereupon the torque limit value setting process for the present hold pressure control operation execution period (pulse distribution period) ends.

The servo CPU 12 reads out the torque limit value, updated in Step S9, from the RAM 14, and in response to this, causes the torque control circuit 9 to control the output torque of the servomotor 1 to this torque limit value, and applies a target hold pressure (here PS+$\Delta P$ ($\Delta P<0$)) for the present period to the screw 2.

Thereafter, the next period is entered. Since the torque limit value is modified during the preceding period, it is concluded in Step S1 that the value C in the modification frequency counter is not "0." Then, the program proceeds to Step S14, whereupon whether the pressure hold time T1 (generally, $T_{i+1}$) set in the timer TE is terminated is determined. Here the decision is negative, so that whether the required modification frequency n is attained by the value C in the modification frequency counter is determined (Step S15). Here the value C is "1," and the decision in Step S15 is negative, so that the modification amount $\Delta P$ is added again to the first register R (P1) to effect second modification and updating of the torque limit value (Steps S8 and S9), whereupon the program proceeds to Step S10. Since the value C is "1," the program proceeds to Step S13 without execution of Steps S11 and S12, whereupon the value C in the modification frequency counter is updated. The servo CPU 12 operates so that the hold pressure of PS+2ΔP is applied to the screw 2 in accordance with the modified torque limit value.

Figure 7:
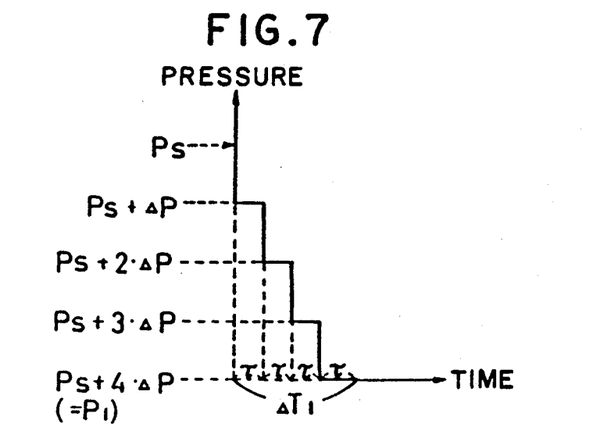
FIG. 7 is a diagram showing the relationship between torque limit value and time, established immediately after the start of a first pressure hold stage.

In this manner, the NCCPU 11 updates the torque limit value for each period while the program is proceeding from the final stage of the injection process to the first pressure hold stage of the pressure hold process (generally, between adjacent pressure control stages). When the modification of the torque limit value for the required modification frequency n(=4) is completed, that is, when switching from the maximum injection pressure PS to the torque limit value P1 for the first pressure hold stage is completed, as shown in FIG. 7, this is discriminated in Step S15 of the immediately succeeding period, and the torque limit value setting process for the present period is finished without further modifying the torque limit value. In the subsequent period, only a loop including Step S1, S14, and S15 is executed unless the set time of the timer TE is found to be up, and the torque limit value is kept at the value P1 without being modified. In the meantime, the servo CPU 12 controls the output torque of the servomotor 1 for the torque limit value P1.

Figure 6:
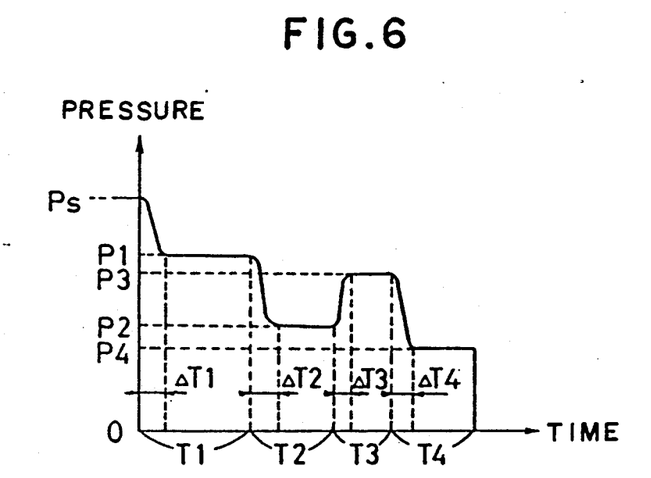
FIG. 6 is a diagram showing the relationship between torque limit value and time, achieved by the hold pressure control operation.

A torque limit value switching pattern, as a function of the parameters PS, P1, τ, and ΔT1, shown in the left end portion of FIG. 6 and in FIG. 7, is set so that the servomotor 1 can satisfactorily follow up this changing pattern, in view of the response output characteristic of the motor, and that unsatisfactory follow-up cannot be caused by the inertia of the servomotor 1 and the screw 2. In other words, the pattern is set so that the hold pressure, produced as a result of deceleration control of the servomotor 1 using the switching time ΔT1 as a time constant, can satisfactorily follow up the torque limit value changing pattern. Therefore, when the program proceeds from the injection process to the first pressure hold stage, in contrast with the case in which the pattern of FIG. 5 is used such that the torque limit value changes in tiers, the hold pressure acting on the screw 2 driven by the servomotor 1 cannot substantially undershoot the torque limit value, which undershoot would otherwise occur due to unsatisfactory response of the servomotor 1 and the inertia of the servomotor 1 and the screw 2.

Thereafter, when it is concluded in Step S14 that the set time of the timer TE is up, that is, the pressure hold time T1 in the first pressure hold stage is terminated, the NCCPU 11 adds "1" to the value i in the pressure hold stage number counter (Step S16), and the modification frequency counter is reset to "0" (Step S17). Then, whether the set pressure hold stage number I (=4) is reached by the counter value i is determined (Step S18). Here the counter value i is "1", which is less than the set value I, so that the program proceeds to Step S2, whereupon a predetermined switching time ΔT2 for the second pressure hold stage is read out from Table TB. Subsequently, the required modification frequency n for the second pressure hold stage is calculated (Step S3), and whether the counter value i is "0" is determined (Step S4). The decision here is negative, and a torque limit value P2 for the second pressure hold stage is read out from Table TB, and is set in the second register R (P2) (Step S6). Then, just as in the case of the transition to the first pressure hold stage, the NCCPU 11 gradually updates the torque limit value from the value P1 to the value P2 for each period, using the modification amount ΔP for the transition from the first pressure hold stage to the second pressure hold stage, while updating the value C in the modification frequency counter. Also, the NCCPU 11 starts the timer TE with a pressure hold time T2 for the second pressure hold stage set therein (Steps S8 to S13), and executes only the loop including Step S1, S14, and S15, thereby keeping the torque limit value at the value P2, for the duration of the pressure hold time T2 after the completion of the transition to the second pressure hold stage. On the other hand, the servo CPU 12 controls the output torque of the servomotor 1 to the torque limit value gradually updated from the value P1 to the value P2 and then kept at the value P2. After the passage of the pressure hold time T2, the program proceeds to the third pressure hold stage, in the manner as aforesaid, and further to the fourth pressure hold stage. It is to be noted that the torque limit value switching pattern (FIG. 6) for the transition to each of the second to fourth pressure hold stages, unlike the one shown in FIG. 5, is set so that the produced hold pressure can satisfactorily follow up the pattern at its leading and trailing edges, and therefore, the produced hold pressure cannot substantially overshoot or undershoot the torque limit value.

When the fourth pressure hold stage (generally, the I th pressure hold stage) ends, the pressure hold stage number counter is reset (Step S19). Also, the subsequent processes, including the metering process, are executed, whereupon one injection-molding cycle is finished. Thereafter, the injection-molding cycle is repeatedly executed in the same manner as aforesaid.

Figure 8:
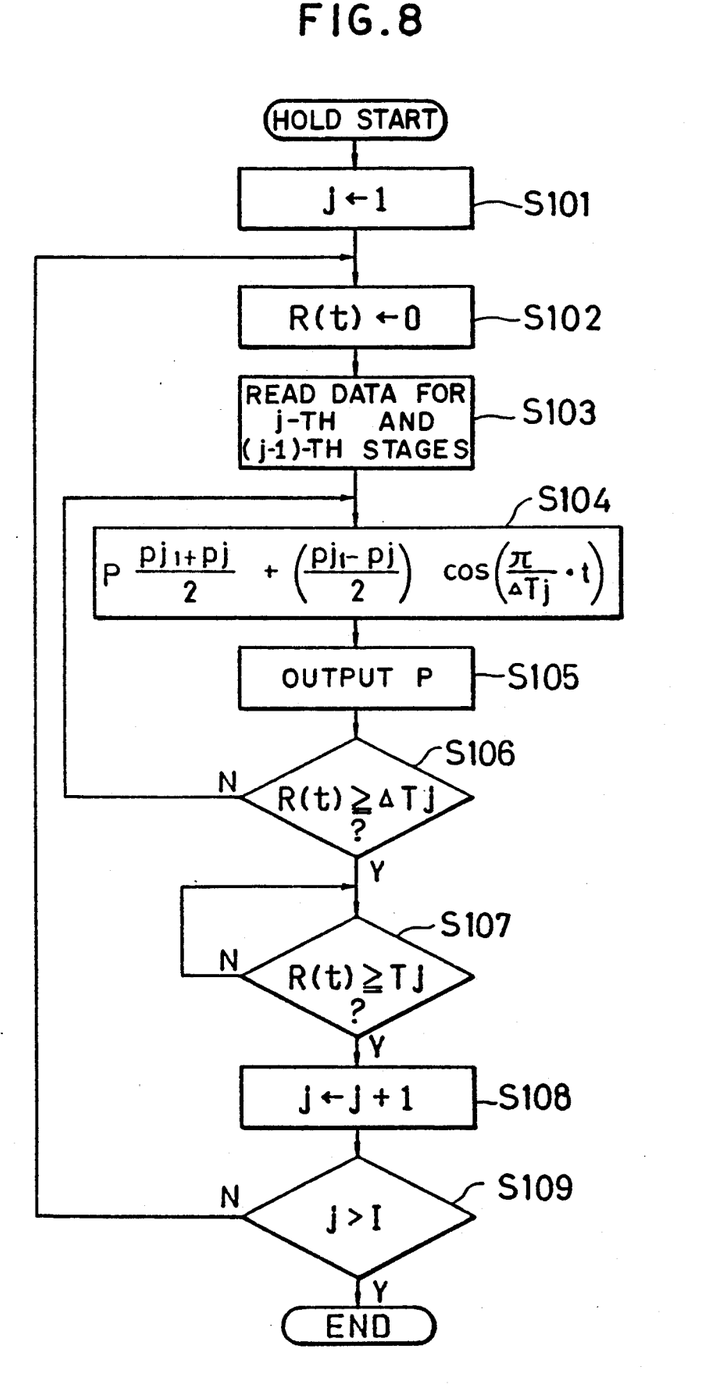
FIG. 8 is a flow chart showing hold pressure control operation according to another embodiment of the present invention, executed in the injection-molding machine of FIG. 1.
Figure 9:
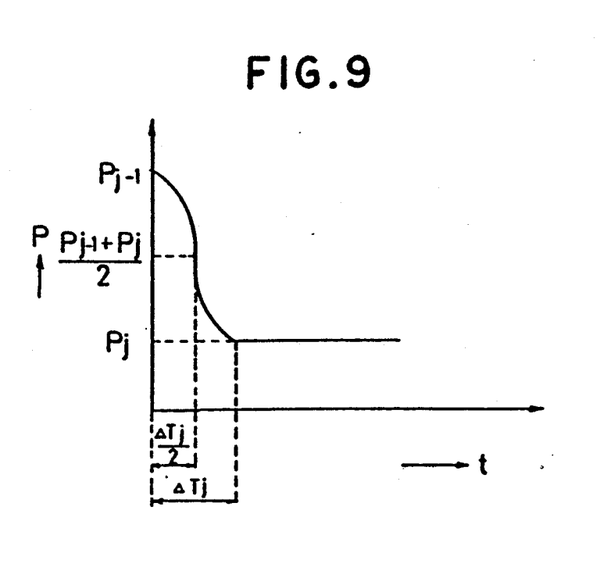
FIG. 9 is a diagram showing the relationship between the torque limit value and time obtained when a torque limit value for a pressure hold stage before transition is greater than that for a pressure hold stage after the transition.
Figure 10:
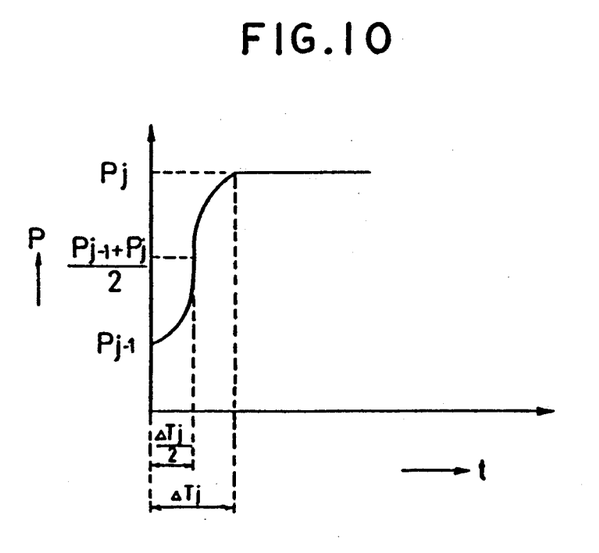
FIG. 10 is a diagram similar to FIG. 9, showing the case where the torque limit value for the pressure hold stage before the transition is smaller than that obtained after the transition.

Referring now to FIGS. 8 to 10, a multi-stage pressure control method according to a second embodiment of the present invention will be described in connection with the hold pressure control of FIG. 5, by way of example.

The method of this embodiment, unlike the method of the foregoing embodiment which uses a target pressure variation pattern indicative of a linear change from the target pressure at the pressure control stage before the transition to that at the control stage after the transition, is designed so that multi-stage pressure control can be more smoothly effected using a pattern such that a change per unit time of the target value immediately before the completion of the transition gradually approaches zero. The method of the present embodiment can be executed by means of the apparatus shown in FIG. 1.

When the operator inputs hold pressure control parameters I, $P_j$, $T_j$, and $\Delta T_j$ (here $j=i+1$, and the control parameter i is defined in the description of the foregoing embodiment), as in the foregoing embodiment, the NCCPU 11 causes Table TB (FIG. 2) to store these parameters.

When the pressure hold process is entered after the start of the operation of the injection-molding machine, the NCCPU 11 sets a value j in the pressure hold stage number counter to "1" (Step S101 of FIG. 8), resets a timer R (t), which indicates the lapse of time t from an instant at which the transition to a new pressure hold stage (first pressure hold stage in this case) is started, to "0," and then starts the timer (Step S102). Then, the NCCPU 11 discriminates the present or subsequent pressure hold stage number j in accordance with the counter number j. Here the pressure hold stage is regarded as the first one, and the torque limit value P1, pressure hold time T1, and switching time ΔT1 for the first pressure hold stage (generally, the parameters $P_j$, $T_j$, and $\Delta T_j$ for the subsequent pressure hold stage) are read out from Table TB of the RAM 14, while the maximum injection pressure PS (generally, a torque limit value $P_{j-1}$ for the preceding pressure hold stage) is read out from another memory region of the RAM 14 (Step S103). Using the parameters read out in the aforesaid manner, the torque limit value P for the present hold pressure control operation execution period is calculated in accordance with a predetermined arithmetic expression for calculating the torque limit value, e.g., the following equation (1) (Step S104).

$$P = \{(P_{j-1}+P_j)/2\} \cos(\pi t/\Delta T_j) + \{(P_{j-1}+P_j)/2\} \quad (1)$$

According to equation (1), the calculated torque limit value P is equal to target pressures (more specifically, corresponding ones of the maximum injection pressure PS and the torque limit values P1 to P4) for the pressure control stages before and after the transition, at the transition start point (t=0) and a transition end point (t=$\Delta T_j$). During the transition (0<t<$\Delta T_j$), the value P gradually increases or decreases along a cosine curve, from the former target pressure to the latter target pressure (see FIGS. 9 and 10). The changing rate of the value P with respect to the variable t is "0" at the transition start point and the transition end point, and has a maximum at the middle point (t=$\Delta T_i/2$) of transition.

The NCCPU 11 causes the torque limit value storage region of the RAM 17 to store the thus calculated torque limit value P for the present period (Step S105). Meanwhile, the servo CPU 12 reads out the stored value, controls the output torque of the servomotor 1 to the value P, and applies the target hold pressure for the present period to the screw 2.

Then, referring to the timer R (t), the NCCPU 11 determines whether the switching time ΔT1 (generally, $\Delta T_j$) has elapsed from an instant at which the transition is started (Step S106). If the switching time ΔT1 is not terminated, the processing of Step S104 is executed to calculate a new torque limit value P, and updates the torque limit value stored in the RAM 14 for the calculated value in Step S105. Processing of a loop including Steps S104 to S106 is periodically executed until the switching time ΔT1 terminates. In the meantime, the variable t gradually changes, so that the torque limit value periodically calculated according to equation (1) changes in tiers, and in substance, changes smoothly along a cosine curve (torque limit value switching pattern) shown in FIG. 9 or FIG. 10. In general, the switching pattern characterized by the control variable $\Delta T_j$, which resembles the pattern shown in FIG. 6, is set so that the servomotor 1 can satisfactorily follow up the pattern, in view of the response output characteristic of the motor, and that unsatisfactory follow-up cannot be caused by the inertia of the servomotor 1 and the screw 2. Thus, the hold pressure actually applied to the screw 2, which is driven by the servomotor 1, changes smoothly from the value $P_{j-1}$ to the value $P_j$, and never overshoots or undershoots with respect to the switching pattern.

Thereafter, if it is concluded in Step S106 that the switching time ΔT1 is terminated, whether the pressure hold time T1 for the first pressure hold stage is terminated is repeatedly determined (Step S107). In the meantime, the torque limit value is kept at the value P1 obtained upon passage of the switching time ΔT1, and the actual hold pressure acting on the screw 2 is controlled to the value P1.

When the pressure hold time T1 terminates, "1" is, added to the pressure hold stage number counter value j (Step S108), and then whether the value j exceeds the pressure hold stage number I (=4) is determined (Step S109). Here we have j=2, so that the program proceeds to Step S102, whereupon the hold pressure control for the second pressure hold stage is executed in the aforementioned manner. Thereafter, when the control for the second to fourth pressure hold stages is finished, the decision in Step S109 is positive, whereupon the hold pressure control is finished. According to the method of the present embodiment, as is evident from the above description, the actually produced pressure satisfactorily follows up the target pressure which varies with the lapse of time, so that the multi-stage pressure control can be smoothly effected.

Although the hold pressure is subjected to open-loop control in both the embodiments described above, the present invention may be also applied to closed-loop control.

In both of the aforementioned embodiments, moreover, the torque limit value (target hold pressure) is updated at the initial part of the subsequent pressure hold stage. Alternatively, however, the updating may be performed between the last part of the preceding pressure hold stage and the initial part of the subsequent pressure hold stage.

In the second embodiment described above, furthermore, the torque limit value is updated using equation (1) which includes the cosine function varying as a function of the lapse of time t from an instant at which the transition starts. Alternatively, however, the torque limit value may be updated using various arithmetic expressions, such as a cubic polynomial expression and a hyperbolic functional equation varying as a function of t, e.g., the following equation (2), in which a torque limit value is given such that a changing amount thereof appearing immediately before or on completion of the transition gradually approaches "0." The longer a required arithmetic time for calculation of the torque limit value, the more difficult it is to execute smooth multistage pressure control, so that the arrangement should preferably be of a type which permits high-speed arithmetic operation.

$$P = \{2(P_{j-1}-P_j)t^3/\Delta T_j^3\} - \{3(P_{j-1}-P_j)t^2/\Delta T_j^2\} + P_{j-1} \quad (2)$$

Differentiating both sides of equation (2) with variable t, we obtain the following equation (3).

$$dP/dt = \{6(P_{j-1}-P_j)t^2/\Delta T_j^3\} - \{6(P_{j-1}P_j)t/\Delta T_j^2\} \quad (3)$$

As is evident from equations (2) and (3), the torque limit value P calculated according to equation (2), like the calculated value based on equation (1), gradually increases or decreases from a value $P_{j-1}$ obtained at the transition start point (t=0) to the value $P_j$ obtained at the transition end point (t=$\Delta T_j$), and the changing rate at both these points of time is "0," thus permitting smooth multi-stage pressure control.

Although the switching of the target hold pressure for the pressure hold process has been described in connection with the two embodiments described above, moreover, the present invention is not limited to this. For example, the present invention may be also applied to switching of the target injection pressure between adjacent injection pressure control stages and switching from the target pressure for the final stage of the pressure hold precess to a target back pressure for the metering process. Also in this case, the aforementioned modifications may be effected.

We claim:

1. A pressure control method for a motor-operated injection-molding machine in which an operating part of a pressurization apparatus is driven by a servomotor, comprising steps of:

(a) setting and storing a target pressure for each of a plurality of pressure control stages and a respective predetermined switching time in which switching of the target pressures between associated adjacent pressure control stages is to be finished;

(b) gradually changing one of the stored target pressures from a first target pressure to a second target pressure corresponding to a pressure control stage, during one of the predetermined switching times; and (c) controlling an actual pressure in the pressurization apparatus to one of the stored target pressure in a pressure control stage, and controlling the actual pressure based on the gradually changing one of the stored target pressures.

2. A pressure control method according to claim 1, further comprising the steps of:

setting and storing an execution time for each of said pressure control stages, and wherein step (c) comprises the substep of:

controlling an actual pressure in the pressurization apparatus to another one of the stored target pressures corresponding to another pressure control stage when an execution time for the pressure control stage terminates.

3. A pressure control method according to claim 1, wherein said pressure control process is a pressure hold process.

4. A pressure control method according to claim 1, wherein step (b) comprises the substep of:

linearly changing the one of the stored target pressures.

5. A pressure control method according to claim 1, wherein step (b) comprises the substep of:

changing the one of the stored target pressures such that an amount of change of the one of the stored target pressures at the end of the one of the predetermined switching times, approaches zero.

6. A pressure control method according to claim 5, wherein step (b) comprises the substep of:

changing the one of the stored target pressures such that an amount of change of the one of the stored target pressures, at the start of the one of the predetermined switching times, is approximately zero.

7. A pressure control method according to claim 6, wherein step (b) comprises the substep of:

changing the one of the stored target pressures in accordance with a predetermined curve which monotonously changes from the first target pressure to the second target pressure.

8. A pressure control method according to claim 7, wherein said predetermined curve is a cosine curve.

9. A pressure control method according to claim 7, wherein said predetermined curve is a cubic curve.

10. A pressure control apparatus of an injection-molding machine for restricting the output torque of a servomotor, used to drive an operating part of a pressurization apparatus, to a torque limit value indicative of a target pressure, said pressure control apparatus comprising:

means for storing a torque limit value, a predetermined switching time and an execution time for each of a plurality of pressure control stages;

means for calculating a number of repetitions of modification by dividing a predetermined switching time and an execution time associated with a first pressure control stage, and for calculating a modification amount by dividing a difference between a torque limit value for a prior pressure control stage and a torque limit value for the first pressure control stage by the number of repetitions of modification;

means for gradually updating the torque limit value for the first pressure control stage by respectively adding the modification amount to the torque limit value; and means for controlling an actual pressure of the pressurization apparatus to the target pressure in each of the pressure control stages, and for controlling the actual pressure to a corresponding torque limit value for each of the pressure control stages.

11. A pressure control apparatus according to claim 10, wherein said means for storing includes first means for storing an execution time for each of the pressure control stages, and wherein said pressure control apparatus includes:

means for discriminating the lapse of the execution time for the first pressure control stage, and for permitting controls for a subsequent pressure control stage to begin when the execution time terminates.

12. A pressure control apparatus of an injection-molding machine for restricting an output torque of a servomotor, used to drive an operating part of a pressurization apparatus, to respective torque limit values indicative of corresponding target pressures for corresponding pressure control stages, said pressure control apparatus comprising:

means for storing a torque limit value and a corresponding predetermined switching time for each of the pressure control stages;

means for periodically calculating a torque limit value for a transition between sequential pressure control stages such that the target pressure gradually changes from a target pressure for a first pressure control stage to a second target pressure and such that an amount of change of the target pressure at the end of the transition approaches zero, said periodic calculation being based on a predetermined arithmetic expression including, as parameters, a predetermined switching time associated with the transition, respective torque limit values for the first and second pressure control stages, and an elapsed time within the transition; and means for controlling an actual pressure of the pressurization apparatus to the target pressure for each of the pressure control stages, and for controlling the actual pressure to the corresponding torque limit value during the transition in each of the pressure control stages.

13. A pressure control apparatus according to claim 12, wherein said means for periodically calculating a torque limit value includes means for performing said periodic calculation based on a term of a cosine function which varies as a function of time measured from the start of the transition.

14. A pressure control apparatus according to claim 12, wherein said means for periodically calculating a torque limit value includes means for performing said periodic calculation based on a cubic polynomial expression which varies as a function of time measured from the start of the transition.

15. A pressure control apparatus according to claim 12, wherein said means for storing includes first means for storing an execution time for each of the pressure control stages, and wherein said pressure control apparatus includes:

means for discriminating the lapse of the execution time for the first pressure control stage, and for permitting control for a subsequent pressure control stage to begin when the execution time terminates.

16. A pressure control apparatus according to claim 12, wherein said pressure control process is a pressure hold process.

* * * * *

UNITED STATES PATENT AND TRADEMARK OFFICE
CERTIFICATE OF CORRECTION

PATENT NO. : 5,030,395
DATED : July 9, 1991
INVENTOR(S) : Kamiguchi et al.

It is certified that error appears in the above-identified patent and that said Letters Patent is hereby corrected as shown below:

Col. 10, line 54, Eq. (3), "$\{6(P_{j-1}P_j)$" should be --$\{6(P_{j-1}-P_j)$--.

Col. 11, line 4, "precess" should be --process--.

Signed and Sealed this

Tenth Day of November, 1992

*Attest:*

DOUGLAS B. COMER

*Attesting Officer*     *Acting Commissioner of Patents and Trademarks*